United States Patent [19]
Kindler

[11] Patent Number: 5,585,572
[45] Date of Patent: Dec. 17, 1996

[54] DEFORMATION MEASURING DEVICE FOR MEASURING THE TORQUE OF A CYLINDRICAL SHAFT

[76] Inventor: Ulrich Kindler, Parchimerstr. 15, 2000 Hamburg 72, Germany

[21] Appl. No.: 364,834

[22] Filed: Dec. 23, 1994

Related U.S. Application Data

[63] Continuation of Ser. No. 46,690, Apr. 12, 1993, abandoned.

[30] Foreign Application Priority Data

May 9, 1992 [DE] Germany ............... 42 15 306.9

[51] Int. Cl.⁶ .................................. G01L 1/22
[52] U.S. Cl. ....................... 73/862.338; 73/782
[58] Field of Search ............. 73/862.321, 862.325, 73/862.338, 781, 782

[56] References Cited

U.S. PATENT DOCUMENTS

| | | | |
|---|---|---|---|
| 2,392,293 | 1/1946 | Ruge | 73/862.338 |
| 2,423,620 | 7/1947 | Ruge | 73/862.338 |
| 2,428,012 | 9/1947 | Collins, Jr. et al. | 73/862.338 X |
| 2,563,425 | 8/1951 | Schaevitz | 73/862.338 |
| 2,566,566 | 9/1951 | Howes | 73/862.338 X |
| 3,610,036 | 10/1971 | Saxl | 73/862.338 X |
| 3,791,205 | 2/1974 | Hooker | 73/782 X |
| 3,850,030 | 11/1974 | Adler | 73/862.339 |
| 4,502,340 | 3/1985 | Gebben | 73/862.325 |
| 4,649,758 | 3/1987 | Harbonr | 73/782 X |

FOREIGN PATENT DOCUMENTS

| | | | |
|---|---|---|---|
| 0159825 | 10/1985 | European Pat. Off. | G01L 3/10 |
| 0352595 | 1/1990 | European Pat. Off. | |
| 0528071 | 6/1931 | Germany | 73/862.338 |
| 7206840 | 12/1982 | Japan | 73/862.321 |
| 3205526 | 9/1991 | Japan | 73/862.325 |
| 4168331 | 6/1992 | Japan | 73/862.321 |
| 8303744 | 5/1985 | Netherlands . | |

OTHER PUBLICATIONS

"Measuring Force in Difficult or Varying Environments" H. M. Morris, Control Engineering, Sep. 1978.

"Mikrorechnergestutzte Werkzeuguberwachung auf der Basis von Dehnungsmessungen an Drehmachinen", Stange, B, Feingeratetechnik 36, 1987.

"Drehmoment–Messung", Dr. Steiger, Mohilo+Co. GmbH, Baumwasenstr. 5, D–7060 Schorndorf, p. 11.

*Primary Examiner*—Kenneth A. Wieder
*Assistant Examiner*—Elizabeth L. Dougherty

[57] ABSTRACT

The invention relates to a deformation measuring device (11) for measuring the torque of a cylindrical shaft (10), which device consists of a sensor (12) which rotates together with the shaft (10) and at least one transducer (16) for converting a torque-dependent deformation of the shaft (10) into a signal which can be evaluated and displayed, the sensor (12) being mounted in an axially aligned manner on the external surface (13) of the shaft (10) and comprising edge portions (14, 19) which extend in the axial direction and which are mounted on the external surface (13) of the shaft (10) so as to transmit the deformation of the shaft, the sensor (12) comprising at least one portion (15) of reduced cross-section which is situated between said edge portions (14, 19) and which supports a deformation transducer (16).

10 Claims, 1 Drawing Sheet

DEFORMATION MEASURING DEVICE FOR MEASURING THE TORQUE OF A CYLINDRICAL SHAFT

This is a continuation of application Ser. No. 08/046,690 filed on Apr. 12, 1993 now abandoned.

BACKGROUND OF THE INVENTION

The invention relates to a deformation measuring device for measuring the torque of a cylindrical shaft, comprising a sensor which can be mounted on the shaft and on which there is arranged at least one transducer for converting a torque-dependent deformation of the shaft into a signal which can be evaluated and displayed.

Deformation measuring devices are known per se. For example, they are known from the article "Mikrorechnergestfitzte Werkzeugüberwachung auf der Basis von Dehhnungsmessungen an Drehmachinen", Stange, B, Feinger ätetechnik 36, 1987, Band 10, pp. 463 to 465. Deformation measuring devices of this kind comprise an area of reduced cross-section where, for example strain gauges are provided. A comparatively greater deformation occurs in the area of reduced cross-section. Only deformation in the plane of the sensor or the bending of a beam can be measured. Deformation measuring devices of this kind which are suitable for measuring the bending of a beam, therefore, are not suitable for torque measurement, that is to say measurement of the deformation of a shaft by torsion.

For torque measurement of a cylindrical shaft, for example, the leaflet "Drehmoment-Messung", Dr. Steiger, Mohilo+Co GmbH, Baumwasenstr. 5, D-7060 Schorndoff, page 11, describes a deformation measuring device which is referred to as a DMS-Aufnehmer FN. This deformation measuring device utilizes frequency-modulated signal transmission. In a housing there is accommodated a journalled shaft. This shaft comprises a torsion zone in the form of a constricted area in which strain gauges are provided in a bridge circuit. The bridge converts a torque between two shafts into a proportional electric signal. At the drive end of the shaft of the deformation measuring device there are provided two transformer coils for signal transmission. The larger coil serves to feed the electronic circuitry in the rotating shaft, whereas the smaller coil transmits the measurement signal from the shaft to the housing. The electronic evaluation circuitry is accommodated in a connection box of the housing.

SUMMARY OF THE INVENTION

Thus for such devices were used notably for torque measurement of drive shafts, for example of a tooling machine. On the one hand, these devices are not very sensitive and on the other hand they always require a weakening of the shaft to be examined for torsion. Furthermore, because of the necessary weakening of the shaft to be measured, these devices usually cannot be fitted at a later stage.

It is an object of the present invention to provide a deformation measuring device for measuring the torque of a cylindrical shaft which has a high measuring sensitivity and which can also be fitted at a later stage, and has the possibility of a contactless transmission of measurement values, without weakening of the shaft to be measured being required.

This object is achieved in accordance with the invention in that the sensor comprises edge portions which can be mounted in an axially aligned manner on the external surface of the shaft so as to transmit the deformation of the shaft, the sensor comprising at least one portion of reduced cross-section which is situated between said edge portions and which supports a deformation transducer.

In a preferred embodiment of the invention, the sensor has a cylindrical shape with comparatively small diameters at the edge portions for mounting on the shaft, said diameters being adapted to the shaft, and a comparatively large diameter at the central portion situated between said edge portions. The comparatively large diameter reliably precludes diversion of force to said central portion. Preferably, in a sensor constructed in accordance with the invention the torque-dependent deformation of the shaft is transmitted to the transducers via the edge portions of the sensor. The portion of reduced cross-section on which the transducer is arranged is then subject mainly to a shearing stress which is already increased by the reduced cross-section and which leads to an increased measuring sensitivity.

In a preferred embodiment, the central portion of the surface of the sensor is reduced to strips which interconnect the two edge portions, transducers being provided centrally on the strips, which are uniformly distributed over the circumference of the sensor, on portions of reduced cross-section parallel to the external surface of the sensor.

Furthermore, four strips may be arranged between the edge portions of the sensor so as to be offset 90° in the circumferential direction.

The reduction of the external surface of the sensor to strips extending in the central portion also enables a further increase of the measuring sensitivity. The arrangement of the transducers on the portions of reduced cross-section is then realised per se on a surface parallel to the external surface of the shaft to be measured. However, it is also feasible to align the transducers in a different manner on the portions of reduced cross-section relative to the external surface of the shaft to be measured, so that for example the bending of the strips is detected.

In a special embodiment of the invention, the edge portions can be attached to the external surface of the shaft by positive coupling, by means of ring clamps or by gluing in the circumferential direction. This method of attachment clearly illustrates that the invention does not necessitate deformation or constriction of the shaft to be measured, so that the device can also be simply fitted at a later stage. In as far as the sensor has a cylindrical shape, positive coupling is preferably utilized, for example, by adaptation of the diameter. When ring clamps are used, inevitable play between the cylindrical sensor and the shaft to be measured can also be neutralized. As has already been stated, the cylindrical as well as the merely strip-shaped sensor can be glued onto the shaft to be measured. All possibilities of attachment have a common aspect in that the attachment of the relevant edge portion retains the central portion quasi like a clamped beam on the corresponding portion of the external surface of the shaft, so that shear stresses directed essentially only in the circumferential direction of the shaft are transmitted to the portion of reduced cross-section.

Even though the portions of reduced cross-section, accommodating the transducers, are in principle arranged approximately at the middle of the strips in the axial direction there may be provided a plurality of portions of reduced cross-section with corresponding transducers, so that the local variation of the torsion can also be determined.

In a preferred embodiment of the invention, each of the transducers may be formed by a measuring bridge circuit. This measuring bridge circuit can be provided, for example, as a strain gauge or by a thin-film technique on the surface of the sensor at the area of the portions of reduced cross-section.

The deformation measuring device in accordance with the invention may comprise a circuit for generating a signal which can be evaluated and displayed, which circuit comprises an oscillator which is permanently connected to the sensor and whereto the transducers are connected as a frequency-determining element, the output of said circuit being connected to a modulator which is connected to a transmitter coil, said circuit also comprising a receiver coil which is coupled to the transmitter coil and which is isolated from the sensor, and also a demodulator which is connected to the receiver coil.

Because of its high sensitivity, the possibility of fitting at a later stage (because no reduction of the cross-section of the shaft to be measured is required), and the contactless transmission of measuring values, the deformation measuring device in accordance with the invention is particularly suitable for measuring a shaft representing a drive shaft for a tooling machine.

Experiments have also demonstrated that in comparison with indirect torque measurement, for example current measurement or the measurement of the small feed forces during tapping or the detection of the small sound signals conducted through the workpiece during tapping, the direct torque measurement in accordance with the invention offers substantially faster recognition of a fracture; this is notably important for the process analysis of boring and notably tapping. The output signal/torque characteristic determined by means of the direct torque measurement in accordance with the invention is linear. For the measurements merely a disturbance wave proportional to the number of revolutions is to be taken into account; however, this disturbance can be readily suppressed by filtering and is linked essentially to the non-constant friction of the bearings supporting the shaft during each revolution, i.e. it is not caused by the

BRIEF DESCRIPTION OF THE DRAWINGS

An embodiment of the invention will be described in detail hereinafter with reference to a drawing. Therein.

DETAILED DESCRIPTION OF THE PREFERRED EMBODIMENTS

Figure 1:
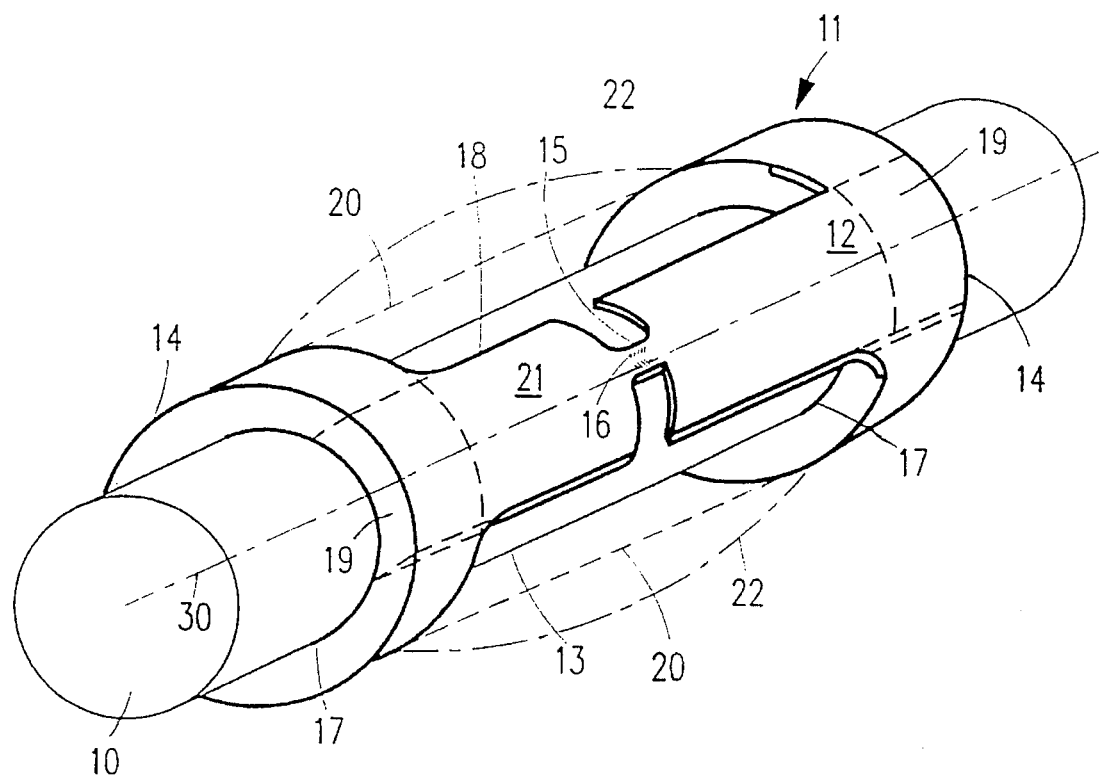
FIG. 1 shows a deformation measuring device in accordance with the invention which is mounted on a shaft and which comprises a sensor with transducers.

FIG. 1 shows a cylindrical shaft 10 on which there is mounted a deformation measuring device 11 in accordance with the invention which comprises a sensor 12 which rotates together with the shaft. The sensor 12 is axially arranged on the external surface 13 of the shaft 10 and comprises edge portions 14 which extend in the axial direction, transmit the deformation of the shaft 10 to the sensor 12, and are secured on the external surface 13 of the shaft 10 for this purpose. Between the edge portions 14 the sensor 12 comprises at least one portion 15 of reduced cross-section which supports a deformation transducer 16. The sensor 12 shown in FIG. 1 may have a cylindrical shape which encloses the shaft 10. For connection to the shaft 10, the edge portions 14 have an adapted, comparatively small diameter 17. The central portion 18, situated between the edge portions 14, has a larger diameter; this larger diameter reliably precludes inter alia diversion of force to this central portion 18.

A particularly simple embodiment of the sensor 12 can be obtained when the edge portions 14 are reduced to prolongations 19 of the central portion 18 shown in FIG. 1 and a cylindrical shape of the sensor 12 is dispensed with. When the remaining edge portions 19 (denoted by dashed lines) of the sensor 12, then being rod-shaped, are appropriately attached to the external surface 13 of the shaft 10, essentially only shear stresses oriented in the circumferential direction of the shaft will be transmitted to the portion 15 of reduced cross-section. Preferably, the edge portions 19 are then glued to the external surface 13 of the shaft 10 so that, viewed in the circumferential direction, the central portion 18 of the sensor 12 is secured on both sides quasi as a clamped beam.

FIG. 1 clearly shows that the external surface 20 of the cylindrical sensor 12, denoted by dashed lines, may be reduced to strips 21 in the central zone 18. In FIG. 1 one strip 21 is visible. A further strip is situated at the opposite side of the shaft 10. As many strips 21 as desired may be provided, said strips then being uniformly distributed over the circumference of the external surface 20 of the sensor 12. When a plurality of strips 21 are used, the sensitivity to any disturbing bending moments superposed on the torque can also be substantially reduced. Approximately at the centre of the strips 21 there is each time provided the portion 15 of reduced cross-section, transducers 16 being arranged thereon so as to extend planeparallel to the external surface 13 of the shaft 10.

The sensor 12 shown in FIG. 1 thus comprises two strips 21, offset 180° in the circumferential direction, between the edge portions 14 of the sensor 12. Alternatively, four strips 21, offset 90° in the circumferential direction, may be provided between the edge portions 14 of the sensor 12.

As has already been stated, the edge portions 14 and 19 are secured to the external surface 13 of the shaft 10 by positive coupling, by means of ring clamps or by gluing in the circumferential direction.

Even though such a configuration is not shown, the strips 21 may also comprise several portions 15 of reduced cross-section with transducers 16 in the axial direction, so that the local torsion can also be detected to a given extent. In a deformation measuring device 11 in accordance with the invention a given sensitivity of the sensor 12 is attractively defined by selection of the distance between the portions 15 of reduced cross-section and the symmetry axis 30 of the shaft 10. The strips 21 of the sensor 12 should then be constructed so as to be curved in conformity with the dash-dot line 22.

The transducers 16 consist of a measuring bridge circuit 23 which may be glued or provided (sputtered) as strain gauges or by a thin-film technique on the surface of the sensor 12 at the area of the portions 15 of reduced cross-section.

Figure 2:
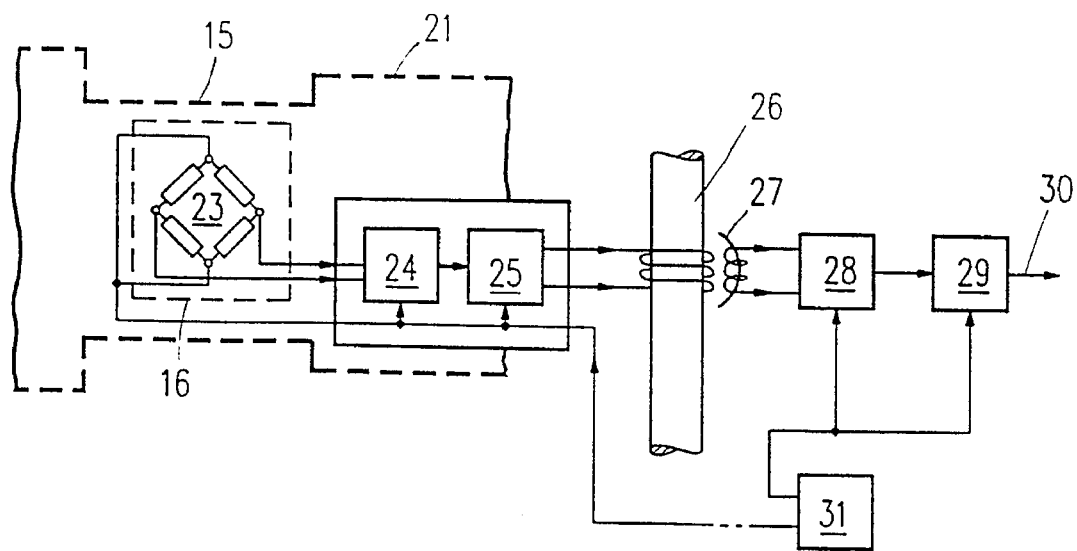
FIG. 2 shows transducers, and evaluation and display elements.

FIG. 2 shows a pan of a strip 21 which comprises a portion 15 of reduced cross-section on which there is provided a transducer 16 which is represented by a measuring bridge circuit 23. In order to generate a signal which can be evaluated and displayed, there may be provided a known contactless energy supply system (dashed line) which is fed by an energy source 31 and which powers the transducer 23, an oscillator 24 and a modulator 25. The oscillator, receiving the detuning of the measuring bridge circuit 23 as the frequency-determining input quantity, and the downstream modulator 25 are provided on the sensor 12 which rotates together with the shaft 10, there also being provided a signal transmission coil 26 which is arranged downstream from the modulator 25. It may also be that the supply of energy is provided by a battery which is also provided on the rotating sensor 12. In conformity with the deformation, and hence the detuning of the measuring bridge circuit 23, the clock frequency of the oscillator 24 is detuned, or modulated accordingly via the modulator 25, and is applied, via the signal transmission coil 26, to a signal receiving coil 27 which is arranged so as to be isolated from the sensor 12 and which is succeeded by a demodulator 28 and an amplifier 29. A torque-dependent conditioned signal is then available at the output 30 of the amplifier 29. The demodulator 28 and the amplifier 29 can also be powered by the energy source 31.

Because of its high sensitivity, its suitability for fitting at a later stage, and the contactless transmission of the measurement values, the deformation measuring device 11 in accordance with the invention is particularly suitable for direct measurement of the torsion of a shaft representing a drive shaft for a tooling machine.

The characteristics of the invention as disclosed in the above description, the Figures and the Claims can be of essential importance, separately as well as in arbitrary combinations, for implementation of the various embodiments of the invention.

I claim:

1. A deformation measuring device for measuring the torque of a single cylindrical shaft, comprising:

a sensor having a pair of annular, axially Opposed edge portions attached to spaced apart portions of the surface of the shaft for transmitting torque dependent deformation of the shaft to the sensor;

a plurality of central strip portions uniformly distributed around the shaft situated between and interconnecting the pair of edge portions each strip portion having at least one region of reduced cross section; and a plurality of deformation transducers one disposed on each at least one region of reduced cross section for converting, a torque-dependent deformation of the shaft into a signal for evaluation and display.

2. The deformation measuring device of claim 1, wherein the sensor has a generally cylindrical shape with a first diameter at the edge portions for mounting on the shaft, said first diameter similar to that of the shaft, and a second diameter which is larger than the first diameter at the central portion situated between said edge portions.

3. A deformation measuring device as claimed in claim 2, wherein the central portion of the external surface of the sensor is reduced to strips which interconnect the two edge portions, transducers being provided centrally on the strips, which are uniformly distributed over the circumference of the sensor, on portions of reduced cross-section parallel to the external surface of the sensor.

4. The deformation measuring device of claim 1, wherein the plurality of central strip portions comprise four strips arranged between the edge portions and each being offset 90° in a circumferential direction.

5. The deformation measuring device of claim 1, further comprising means for attaching the edge portions to the external surface of the shaft by positive coupling, by means of at least one of ring clamps and gluing in the circumferential direction.

6. The device of claim 5 wherein the means for attaching the edge portions to the external surface of the shalt include one of ring clamps and gluing in the circumferential direction.

7. The deformation measuring device of claim 1, wherein each of the transducers comprises a measuring bridge circuit.

8. The deformation measuring device of claim 1, wherein comprising a circuit for generating a signal which is evaluated and displayed, which circuit comprises an oscillator which is permanently connected to the sensor and wherein the transducers are connected as a frequency-determining element, and a modulator connected to the output of said circuit and a transmitter coil, connected to the modulator; and a receiver coil which is coupled to the transmitter coil and which is isolated from the sensor, and a demodulator which is connected to the receiver coil.

9. The deformation measuring device of claim 1, wherein the central strips are connected to an outer surface of each edge portion spaced apart from the shaft.

10. A deformation measuring device for measuring the torque of a single cylindrical shaft, comprising:

a pair of axially opposed edge portions each having a curved inner surface for contacting the surface of the shaft and a curved outer surface spaced from the inner surface by a thickness;

a plurality of central strip portions interconnecting the outer surface of each edge portion, each strip portion having at least one region of reduced cross section; and a transducer disposed on each at least one region of reduced cross section including an oscillator, a modulator and one of a self-contained energy supply and a contactless energy supply system fed by an external energy source, whereby a torque-dependent deformation of the shaft if converted into a signal for evaluation and display.

\* \* \* \* \*